United States Patent [19]

Deines et al.

[11] Patent Number: 4,660,352

[45] Date of Patent: Apr. 28, 1987

[54] APPARATUS AND METHOD FOR PACKAGING COMPRESSIBLE POUCHES

[75] Inventors: Alvin J. Deines; Donald E. Deines, both of Pasco, Wash.

[73] Assignee: Package Machinery Company, East Longmeadow, Mass.

[21] Appl. No.: 812,199

[22] Filed: Dec. 23, 1985

[51] Int. Cl.[4] .............................. B65B 1/24; B65B 5/10
[52] U.S. Cl. ........................................ 53/438; 53/448; 53/475; 53/529; 53/543; 53/247
[58] Field of Search ................. 53/475, 543, 436, 529, 53/247, 248, 249, 255, 540, 560, 448, 438

[56] References Cited

U.S. PATENT DOCUMENTS

| | | | |
|---|---|---|---|
| 2,821,828 | 2/1958 | Kernen, Jr. | 53/248 X |
| 3,021,656 | 2/1962 | Vries | 53/248 |
| 3,169,354 | 2/1965 | Bliss et al. | 53/248 X |
| 3,492,779 | 2/1970 | Russell | 53/248 X |
| 4,194,343 | 3/1980 | Myers et al. | 53/248 X |
| 4,433,526 | 2/1984 | Nord | 53/247 X |

Primary Examiner—Horace M. Culver
Attorney, Agent, or Firm—McCormick, Paulding & Huber

[57] ABSTRACT

Elongated rectangular pouches are longitudinally compressed for packing in a conventional packing case by a pair of counter-rotating paddle assemblies. Each paddle assembly has four paddles arranged in staggered relationship around an associated shaft, the shaft being located outside of and slightly below the path of movement of the pouches as the pouches move in side-by-side relationship between two upright paddles. Two horizontally arranged adjacent paddles receive the pouches at a load station, and rotation of the paddle assemblies drops the pouches between the paddle assemblies as these two paddles move into depending vertical positions where they are more closely spaced relative to one another than the upright paddles in order to compress the pouches as the pouches drop into the case.

7 Claims, 4 Drawing Figures

APPARATUS AND METHOD FOR PACKAGING COMPRESSIBLE POUCHES

This invention relates generally to an apparatus and method for packaging rectangularly shaped longitudinally compressible pouches in an upwardly open packing case, and deals more particularly with orienting several such pouches in side-by-side relationship and sweeping them into a load station where they are acted on by counter-rotating paddle assemblies that not only serve to sequentially drop layers of such pouches into an upwardly open packing case, but wherein the pouches are also compressed slighlty to assure tight packaging of the product in the case.

In its presently preferred form the apparatus for packaging such articles includes an intermittently operated case conveyor to provide upwardly open cases below the load station, and infeed conveyor means for the pouches to be packed such that at least two and preferably three pouches are provided in side-by-side relationship for movement along a horizontal plane spaced above the case to be loaded. Counter-rotating paddle assemblies have individual article receiving paddles oriented in this horizontal plane to receive the articles at the load station, and said paddles are movable together in opposite directions so as to assume downwardly depending positions relative to respective paddle axes spaced slightly below and outside the path of movement of the pouches in this horizontal plane. This geometry assures that the paddles in their depending position are more closely spaced relative to one another than is the initial uncompressed longitudinal dimension of the pouches. More particularly, the spacing between the depending paddles corresponds closely to the corresponding lateral dimension of the packing case itself.

In accordance with the method of the present invention for packaging rectanguarly shaped longitudinally compressible pouches the pouches are oriented with several pouches arranged in side-by-side relationship to form a first array or layer of pouches, and this array is swept onto a pair of horizontally opposed paddles between horizontally spaced guide walls that may themselves comprise paddles for feeding the next array or layer. The lateral spacing between the guide walls is at least as great as the uncompressed longitudinal dimension of the pouches and may be slightly greater than this dimension to assure that the pouches are fed freely into the load station. The paddles rotate on axes that are spaced inside these guide walls, and said axes are also spaced slightly below the horizontal path of movement of the pouches, causing the pouch supporting paddles to drop downwardly into depending positions wherein they are spaced at a lesser distance, corresponding to the compressed longitudinal dimension of the pouches and corresponding closely to the lateral dimension of the packing case itself. This geometry compresses the layer of pouches as the layer drops downwardly between the paddles to provide a tightly packed layer of pouches in the packing case.

Figure 1:
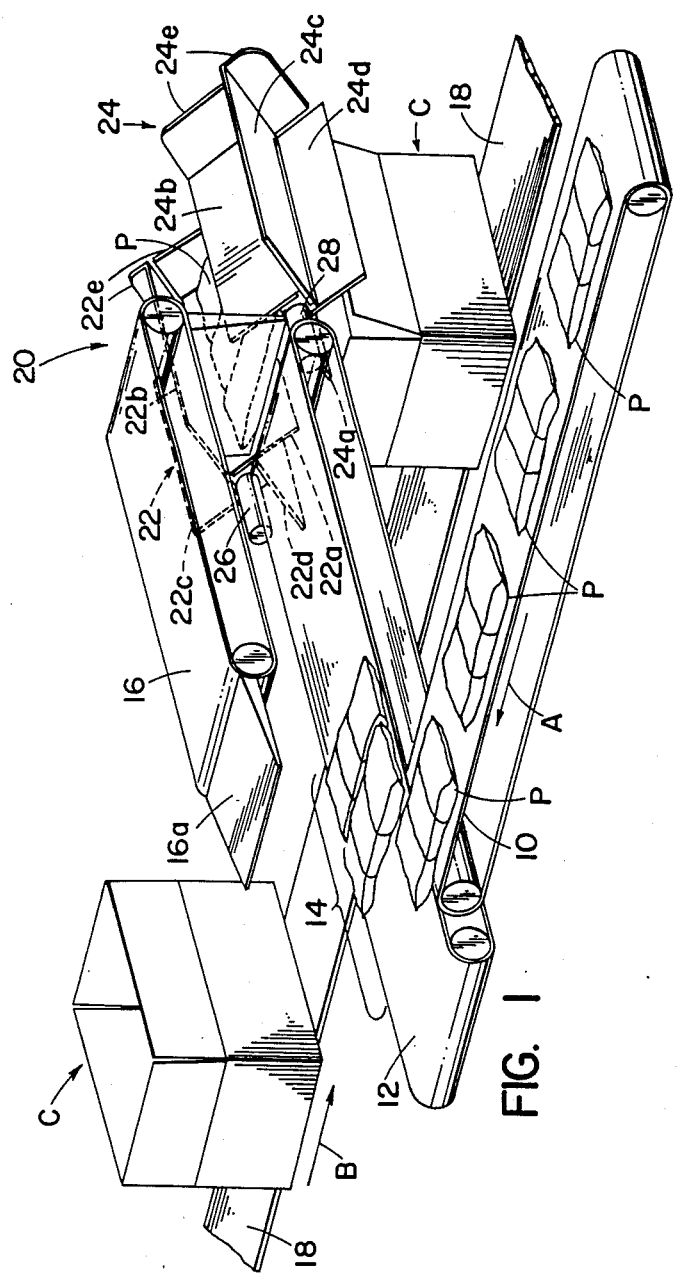
FIG. 1 is a perspective view of an apparatus constructed in accordance with the present invention and adapted to perform the method of the present invention.

Turning now to the drawings in greater detail, FIG. 1 shows apparatus for packaging rectangularly shaped longitudinally compressible pouches P, P in layered fashion inside an upwardly open packing case such as that shown at C. The pouches are most conveniently fed initially in the direction of arrow A single file on a pouch infeed conveyor 10 that may be operated continuously unless the apparatus be shut down for some reason.

These pouches P,P are accumulated on a pouch conveyor 12 oriented at right angles to the infeed conveyor 10 and the pouch conveyor 12 is preferably operated so as to accumulate at least two and preferably three pouches as suggested at 14 in FIG. 1. A predetermined number of such pouches is accumulated at this pouch infeed station to form an array of pouches to be swept from this pouch infeed station to a load station to be described. The means for so sweeping the array or layer of pouches comprises an overhead conveyor 16 having at least one flight 16a that is adapted to sweep at least two pouches in a layer of pouches from the pouch infeed station 14 to the load station indicated generally at 20.

As mentioned previously the upwardly open packing cases C, C are provided on a case conveyor 18, which case conveyor may operate intermittently to provide a case below the pouch loading station 20 referred to above. It will be noted that the cases C move in the direction of arrow B, and below the pouch conveyor 12. More particularly the cases move below a horizontal plane defined by the active upper run of the pouch conveyor 12 so as to provide clearance between the upper end of the case top flaps and the mechanism at the load station for compressing and dropping the pouches into the case. Alternatively the case conveyor 18 may be operated continuously with stops (not shown) provided for locating a case at the load station indicated generally at 20.

Figure 2:
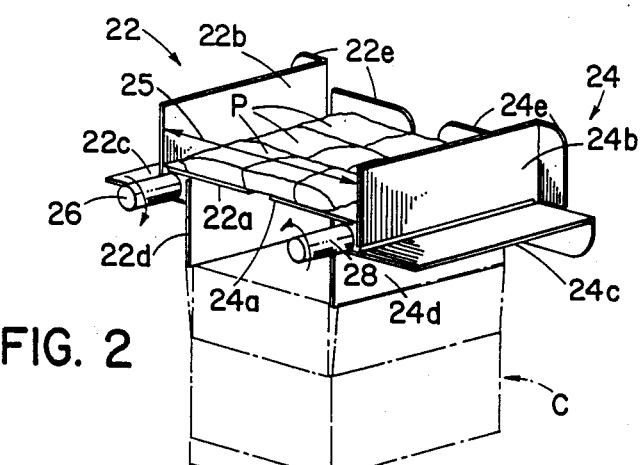
FIG. 2 is a view of the load station and packing case to be filled at an instant of time slightly ahead of that depicted in FIG. 1.

FIG. 2 illustrates three side-by-side pouches P, P at the load station of the machine and illustrates the configuration for two counter-rotating paddle assemblies 22 and 24 at the instant of time when the layer of pouches at the load station has been swept into position by the flight 16a of the overhead conveyor 16. At this instant of time the case C will be have been positioned below the load station as shown in FIG. 2 and it will be apparent that the paddle assemblies are mirror images of one another. The paddles rotate in opposite directions relative to one another as suggested by the arrows in FIGS. 2, 3 and 4.

Each paddle assembly, as for example paddle assembly 24 includes one or more article receiving paddles 24a, and preferably four such paddles 24a, 24b, 24c and 24d are provided in staggered relationship around the axis of an associated shaft 28 such that paddle 24b in FIG. 2 serves as a vertically extending guide wall that cooperates with a counter part paddle 22b associated with the opposite counter-rotating paddle assembly 22 to define a lateral dimension 25 that is at least approximately equal to the uncompressed longitudinal dimension of the pouches P, P and that is significantly greater than the side wall spacing 30 of the packing case C to be loaded. End walls may be provided on each paddle as shown at 22e and 24e in FIGS. 2, 3 and 4.

In the preferred embodiment shown all four paddles are of identical configuration, but it will be apparent that every other paddle in the four paddles shown could simply comprise a guide wall rather than an additional paddle with the necessity then being for the rock shafts 26 and 28 to be rotated through 180 degree increments rather than through 90 degree increments as is true for the embodiment shown.

Figure 3:
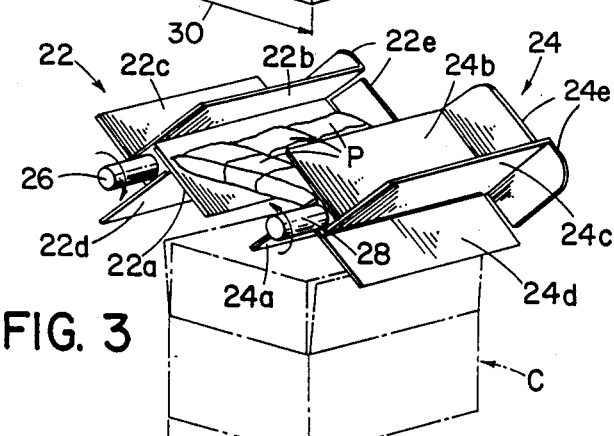
FIG. 3 is a view similar to FIG. 2 but showing the paddle assemblies and pouches at an instant of time slightly later than that of FIG. 2 and corresponding generally to the position for the pouches illustrated in broken lines in FIG. 1.
Figure 4:
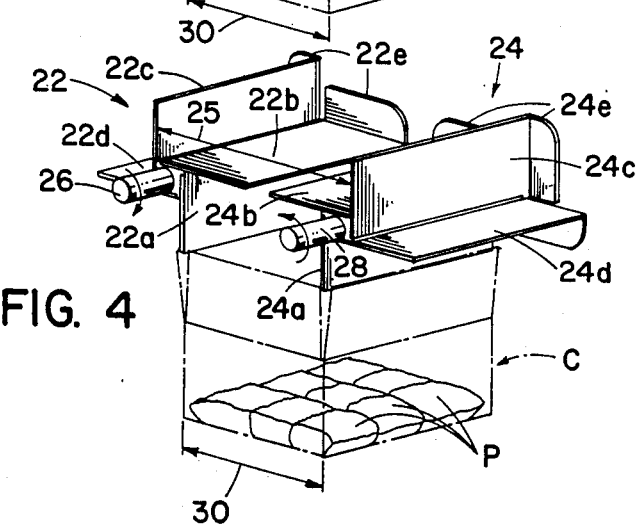
FIG. 4 is a view similar to FIGS. 2 and 3 but illustrating the paddle assemblies at a still later instant of time in their cycle of operation.

FIG. 2 illustrates the paddle assemblies 22 and 24 in position for receiving a layer of pouches and these paddle assemblies are preferably indexed by a mechanism (not shown) for intermittent movement between the position of FIG. 2 through the position of FIG. 3 to a second indexed position such as that illustrated in FIG. 4. Thus, FIG. 3 comprises a transitory position for the paddles and FIGS. 2 and 4 illustrate the paddles in successive indexed positions during their cycle of operation. As mentioned previously the paddle rock shafts 26 and 28 are operated through the various positions required corresponding generally to the number of paddles such that the paddle assemblies 22 and 24 rotate in opposite directions as suggested in FIGS. 2, 3 and 4.

Referring to FIG. 4, paddles 22a and 24a define a confining chute through which the pouches P, P drop and between which these pouches are compressed these paddles 22a and 24a are spaced from one another by a dimension corresponding closely to the dimension 30 of the packing case mentioned previously. This dimension 30 should be contrasted with the dimension 25 referred to previously between the paddles at the load station where the pouches P, P are originally received (See FIG. 2). Thus, the paddles in each assembly extend generally radially outwardly from the paddle axis defined by an associated rock shaft and are oriented in equally spaced but staggered relationship to one another so as to achieve this unique paddle motion whereby they serve first to receive the pouches therebetween at the load station (22b and 24b in FIG. 2) and then as a horizontal deadplate to receive a succeeding array or layer (22a and 24a in FIG. 2), and finally the paddles assume depending positions (22a and 24a in FIG. 4) to define a confining chute wherein the array of pouches is compressed to create a tightly packed layer in the packing case.

We claim:

1. Apparatus for packaging longitudinally compressible pouches in a packing case comprising:
    (a) pouch infeed conveyor means for advancing at least two pouches into a load station where they are provided in side-by-side relationship as an array,
    (b) means for supporting an upwardly open case below the load station,
    (c) counter-rotating paddle assemblies at said load station, each assembly having at least one paddle shaft, means supporting said paddles for pivotal movement on paddle axes, and means for moving said paddles from a horizontal position wherein two such paddles in said respective assemblies support the side-by-side pouches to vertical positions such that the side-by-side pouches are compressed longitudinally between the spaced paddles as they drop downwardly into the packing case between said spaced paddles, said paddles in said vertical positions being spaced more closely relative one another than the spacing between said paddle axes.

2. Apparatus according to claim 1 wherein the two paddles of said respective paddle assemblies are spaced from one another in their vertical positions by a dimension corresponding closely to the lateral dimension of the packing case.

3. Apparatus according to claim 1 wherein each paddle assembly includes at least two paddles arranged in circumaxially spaced relationship relative to an associated paddle axis of rotation.

4. Apparatus according to claim 1 wherein each paddle assembly includes four paddles arranged in equally spaced relationship around an associated paddle axis of rotation.

5. Apparatus according to claim 4 wherein said paddle axes of rotation are spaced slightly below and outside their vertically oriented horizontally spaced paddles, said paddles in said respective paddle assemblies serving successively as vertically upwardly projecting guide walls to receive the pouches therebetween at the load station and then as horizontally oriented deadplates to receive a succeeding array of pouches and then as horizontally spaced vertically oriented pouch compressing plates to compact the array as it drops into the case.

6. Apparatus for packaging longitudinally compressible pouches in a packing case comprising:
    (a) pouch infeed conveyor means for advancing at least two pouches into a load station where they are provided in side-by-side relationship as an array,
    (b) means for supporting an upwardly open case below the load station,
    (c) counter-rotating paddle assemblies at said load station, each assembly having at least one paddle shaft, means supporting said paddles for pivotal movement on paddle axes, and means for moving said paddles from a horizontal position wherein two such paddles in said respective assemblies support the side-by-side pouches to vertical positions such that the side-by-side pouches are compressed longitudinally between the spaced paddles as they drop downwardly into the packing case between said spaced paddles, each paddle assembly further includes a guide wall oriented perpendicularly to said paddle, said guide walls being upright when said two paddles are arranged horizontally to receive the pouches and said guide walls spaced laterally relative to one another to provide clearance for receiving the pouches at the load station without causing compression of the pouches longitudinally.

7. The method for packaging longitudinally compressible elongated pouches comprising:
    (a) providing an upwardly open packing case below a pouch loading station,
    (b) orienting several pouches in side-by-side relationship to form an array or layer,
    (c) sweeping these pouches into the load station between vertically upwardly projecting paddles and onto horizontally opposed paddles all provided on opposed paddle assemblies,
    (d) rotating said paddle assemblies in opposite directions and through approximately ninety degrees so that the horizontal paddles hang vertically downwardly to define a chute through which the array of pouches drops downwardly,
    (e) compressing the array of pouches between these paddles as they drop into the packing case, and
    (f) repeating steps (b), (c), (d), and (e) to provide successive layers of pouches in the packing case.

* * * * *